(12) United States Patent
Casasayas

(10) Patent No.: US 7,134,726 B2
(45) Date of Patent: Nov. 14, 2006

(54) ARMCHAIR FOR PUBLIC TRANSPORT VEHICLES

(75) Inventor: Jaun Singla Casasayas, Martorelles (ES)

(73) Assignee: Fabricación Asientos Vehículos Industriales, S.A., Martorelles (ES)

( * ) Notice: Subject to any disclaimer, the term of this patent is extended or adjusted under 35 U.S.C. 154(b) by 0 days.

(21) Appl. No.: 10/684,933

(22) Filed: Oct. 14, 2003

(65) Prior Publication Data

US 2004/0084949 A1    May 6, 2004

(30) Foreign Application Priority Data

Oct. 31, 2002    (ES)    ................................ 200202598

(51) Int. Cl.
*B60N 3/46*    (2006.01)
(52) U.S. Cl. .............................. 297/411.32; 297/411.38
(58) Field of Classification Search ........... 297/411.38, 297/411.35, 411.32, 411.2, 411.33, 411.3, 297/40, 115; 248/118
See application file for complete search history.

(56) References Cited

U.S. PATENT DOCUMENTS

| 191,689 | A | * | 6/1877 | Little ........................... 297/40 |
| 3,807,799 | A | * | 4/1974 | Freedman .............. 297/411.32 |
| 4,040,665 | A | * | 8/1977 | Wallace et al. ........ 297/411.32 |
| 5,511,849 | A | * | 4/1996 | Cahaley et al. ............. 297/129 |
| 6,161,900 | A | * | 12/2000 | Wang .................... 297/411.38 |
| 6,257,668 | B1 | * | 7/2001 | Chou et al. ............ 297/411.32 |
| 6,467,847 | B1 | * | 10/2002 | Bidare ................... 297/411.32 |

FOREIGN PATENT DOCUMENTS

WO    WO 93/07782    *    4/1993

* cited by examiner

*Primary Examiner*—Milton Nelson, Jr.
(74) *Attorney, Agent, or Firm*—Wolf Block Schorr and Solis-Cohen LLP

(57) ABSTRACT

The armchair comprises a seat where an armchair user is seated and at least one armrest that can be folded between a substantially horizontal position and a substantially vertical position, that is characterized in that the at least one armrest describes a downward trajectory when moved from the substantially horizontal position to the substantially vertical position. The armrest does not bother the armchair user when it is in its substantially vertical position, thus enabling manufacturers to exploit the maximum width allowed for this type of armchairs.

2 Claims, 5 Drawing Sheets

ARMCHAIR FOR PUBLIC TRANSPORT VEHICLES

FIELD OF THE INVENTION

This invention refers to an armchair for public transport vehicles that comprises folding armrests that enable manufacturers to exploit the maximum width allowed for this type of armchairs.

BACKGROUND OF THE INVENTION

Armchairs used currently in public transport vehicles, such as coaches, trains, buses or airplanes, comprise a seat in which the armchair user is seated alongside a backrest. To increase the user's comfort, the backrest may be articulated to the seat, thanks to which it can be reclined or be in a substantially vertical position.

This type of armchairs usually also comprise armrests that can be folded from a substantially horizontal position to a substantially vertical position.

Armrests are usually articulated in the back part of the seat so that when the armrest is placed in its vertical position parting from the horizontal position, the armrest in a vertical position by the backrest. This position leaves practically the whole of the armrest protruding from the front part of the set.

This type of armrests are inconvenient because they are a bother when in a vertical position, as they take up space, an aspect that is extremely important given that the armchairs used in public transport vehicles are only allowed a maximum width.

This inconvenience is increased when two armchairs are placed side by side with armrests between both armchairs. Given that they take up space when in a vertical position, armchairs are usually equipped with a single armrest measuring the normal width of a regular armrest, which implies an inconvenience for the users of both armchairs.

OBJECTS AND SUMMARY OF THE INVENTION

The armchair of the invention manages to solve the aforementioned inconveniences, and presents other advantages that will be described hereunder.

The armchair for public transport vehicles of this invention comprises a seat in which the armchair user is seated and at least one armrest that can be folded between a substantially horizontal position and a substantially vertical position, which is characterized in that the at least one armrest describes a downward trajectory when being moved from the substantially horizontal position to the substantially vertical position.

Preferably, the trajectory described by the at least one armrest is a curved trajectory and the at least one armrest has a curved configuration.

Advantageously, the at least one armrest slides along a guide.

The armchair of this invention, which also comprises a backrest, includes the feature that when the at least one armrest is placed in its substantially vertical position, it does not protrude frontally from the back rest.

Therefore, thanks to the armchair of this invention, the armrest does not bother the armchair user when it is in its substantially vertical position, thus enabling manufacturers to exploit the maximum width allowed for this type of armchairs.

When there are two armchairs like the one conceived in this invention placed side by side, there can be two armrests or one double-width armrest placed between them.

BRIEF DESCRIPTION OF THE DRAWINGS

So as to enable a better understanding of the terms stated above, a series of drawings have been included to, schematically and illustratively, represent a practical case of the embodiment. In the drawings.

DETAILED DESCRIPTION OF THE INVENTION

Figure 1:
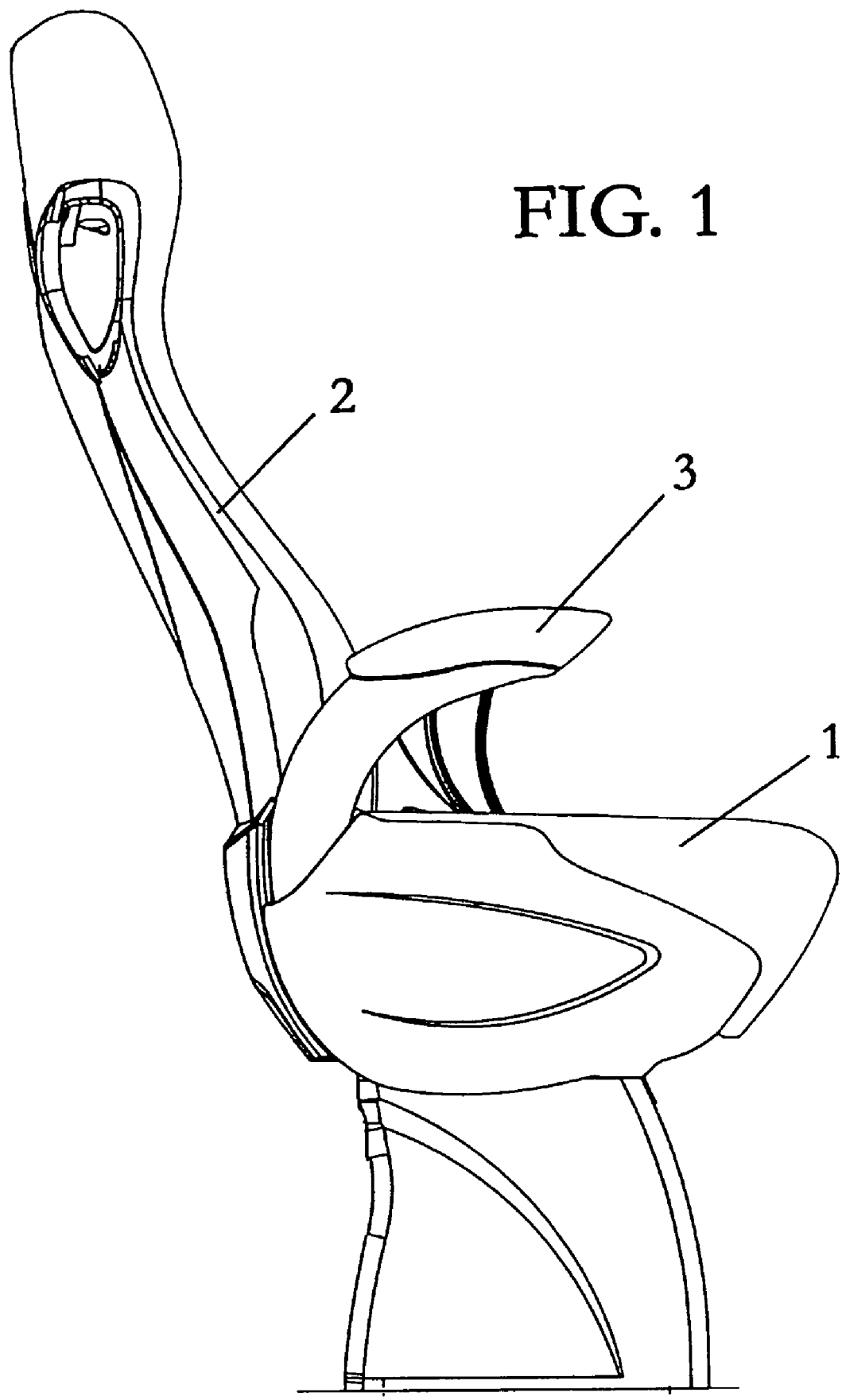
FIG. 1 is a side elevation view of the armchair of this invention, with the armrest in the substantially horizontal position.
Figure 2:
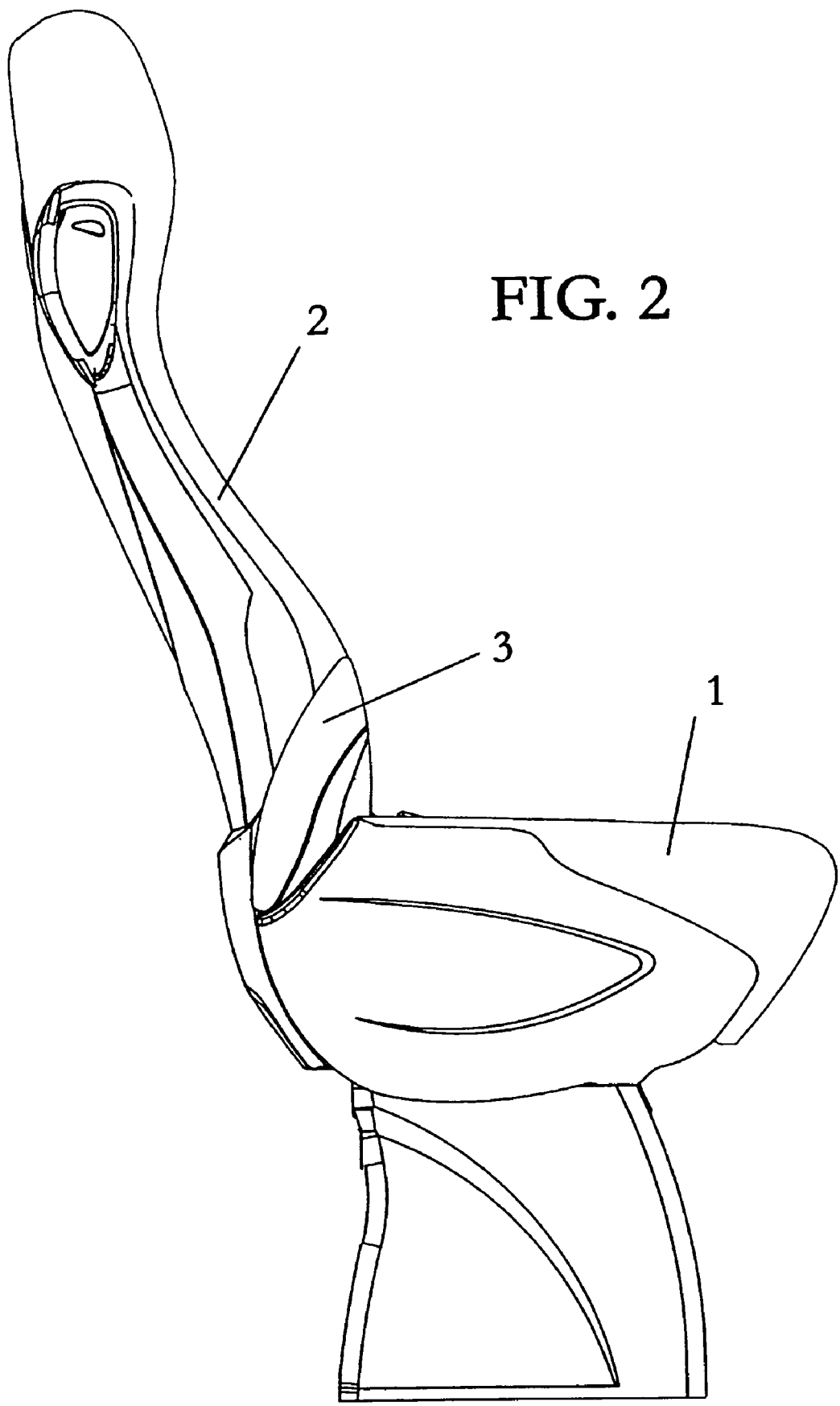
FIG. 2 is a side elevation view of the armchair of this invention, with the armrest in the substantially vertical position.

As can be appreciated in the figures, the armchair of this invention comprises a seat 1, where the armchair user is seated, a backrest 2, that is preferably articulated to the seat so that it can be placed in the position that appears in FIGS. 1 and 2 or can be reclined, and folding armrests 3, one on each side of the seat 1.

Figure 4:
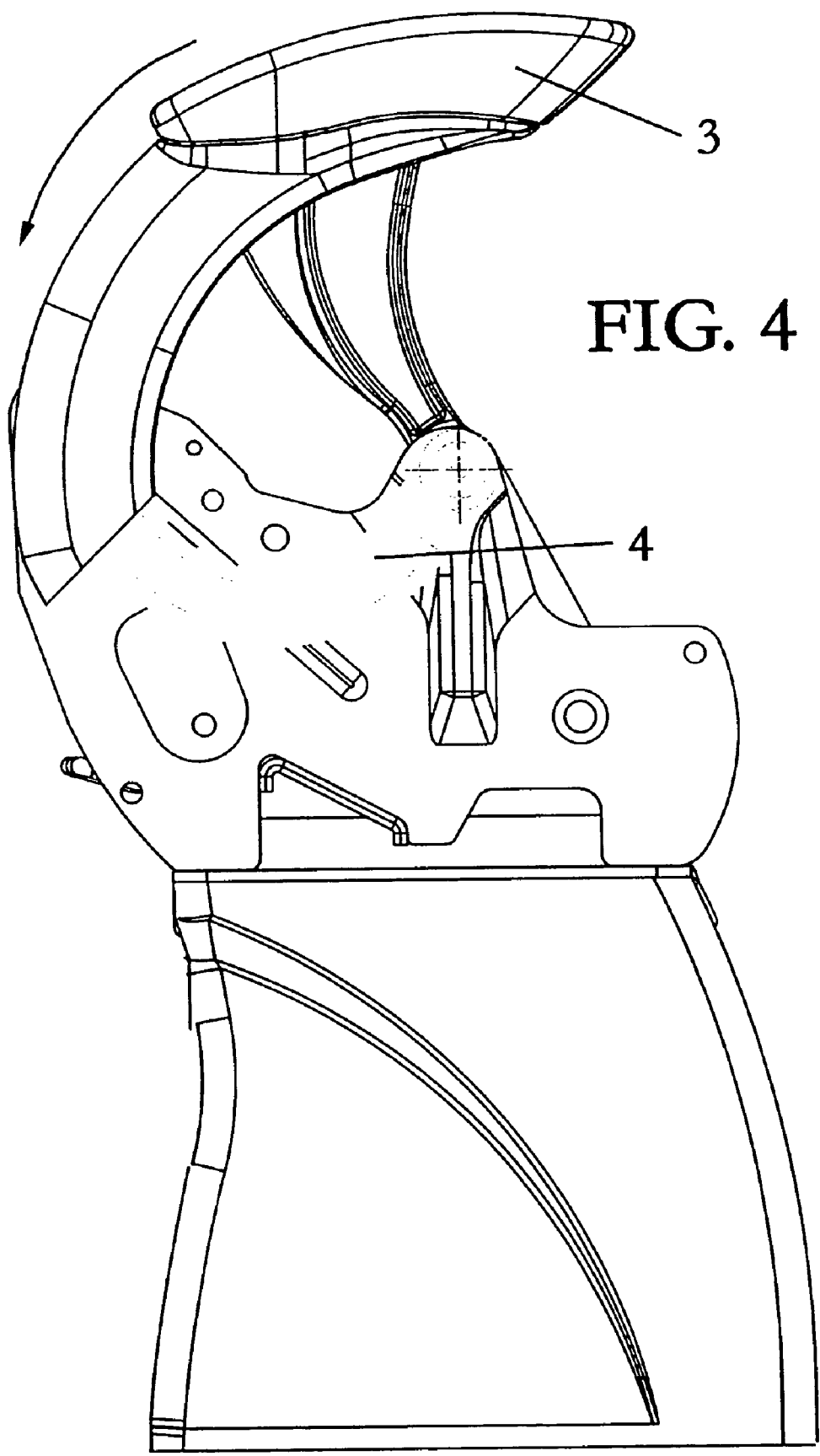
FIG. 4 is a side elevation view of the side of the armchair of this invention, with the armrest in the substantially horizontal position.
Figure 5:
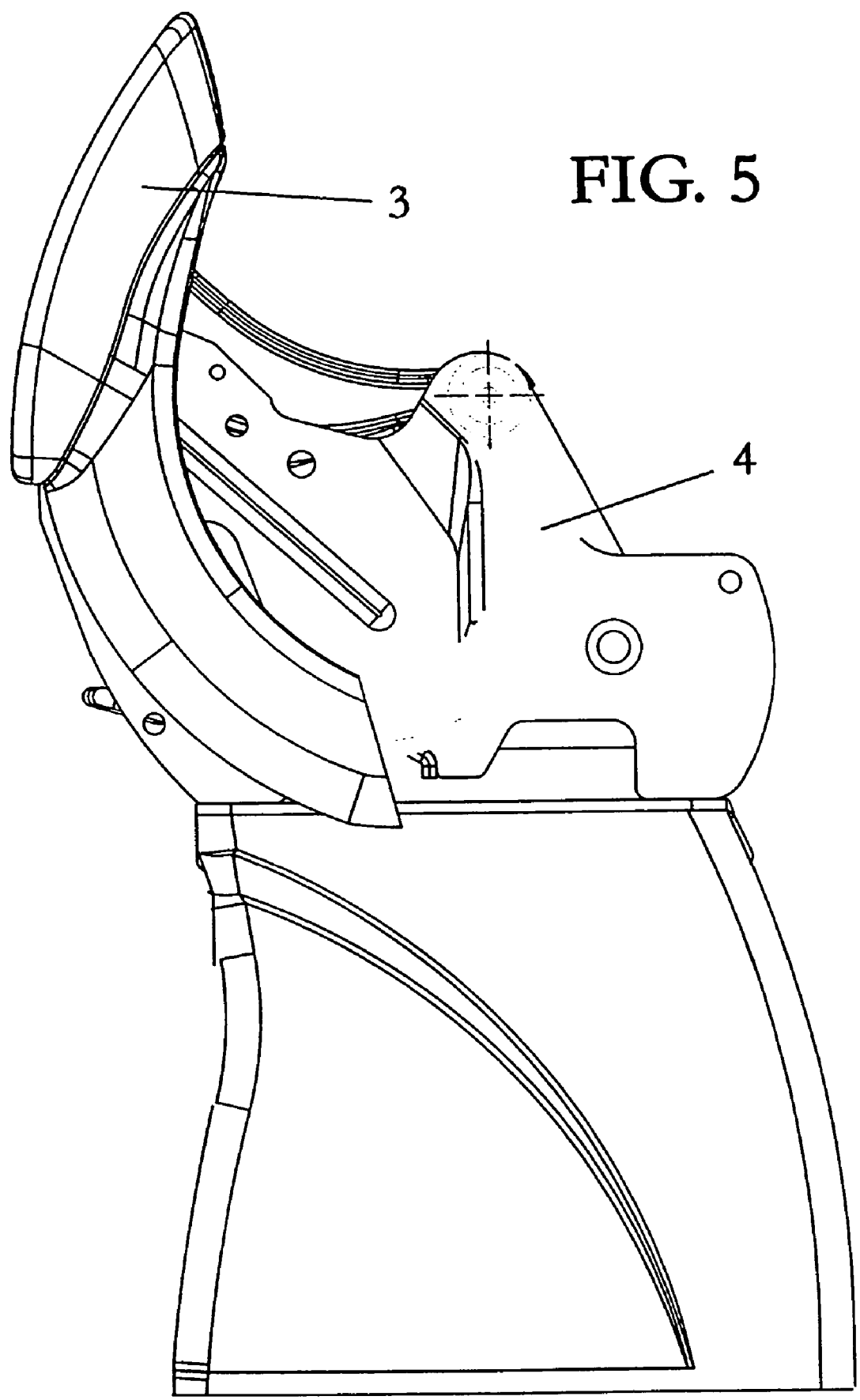
FIG. 5 is a side elevation view of the side of the armchair of this invention, with the armrest in the substantially vertical position.
Figure 4:
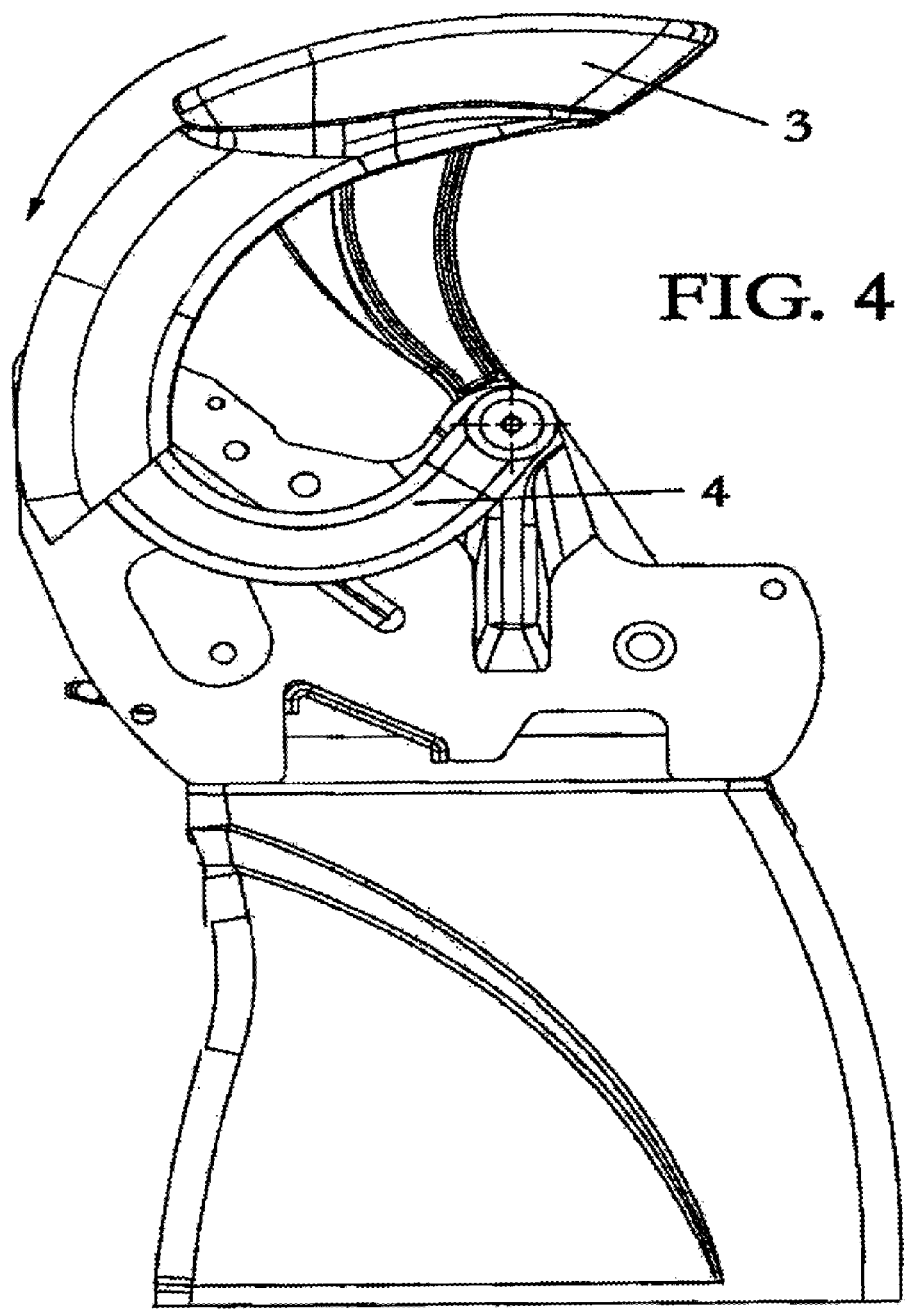
Figure 5:
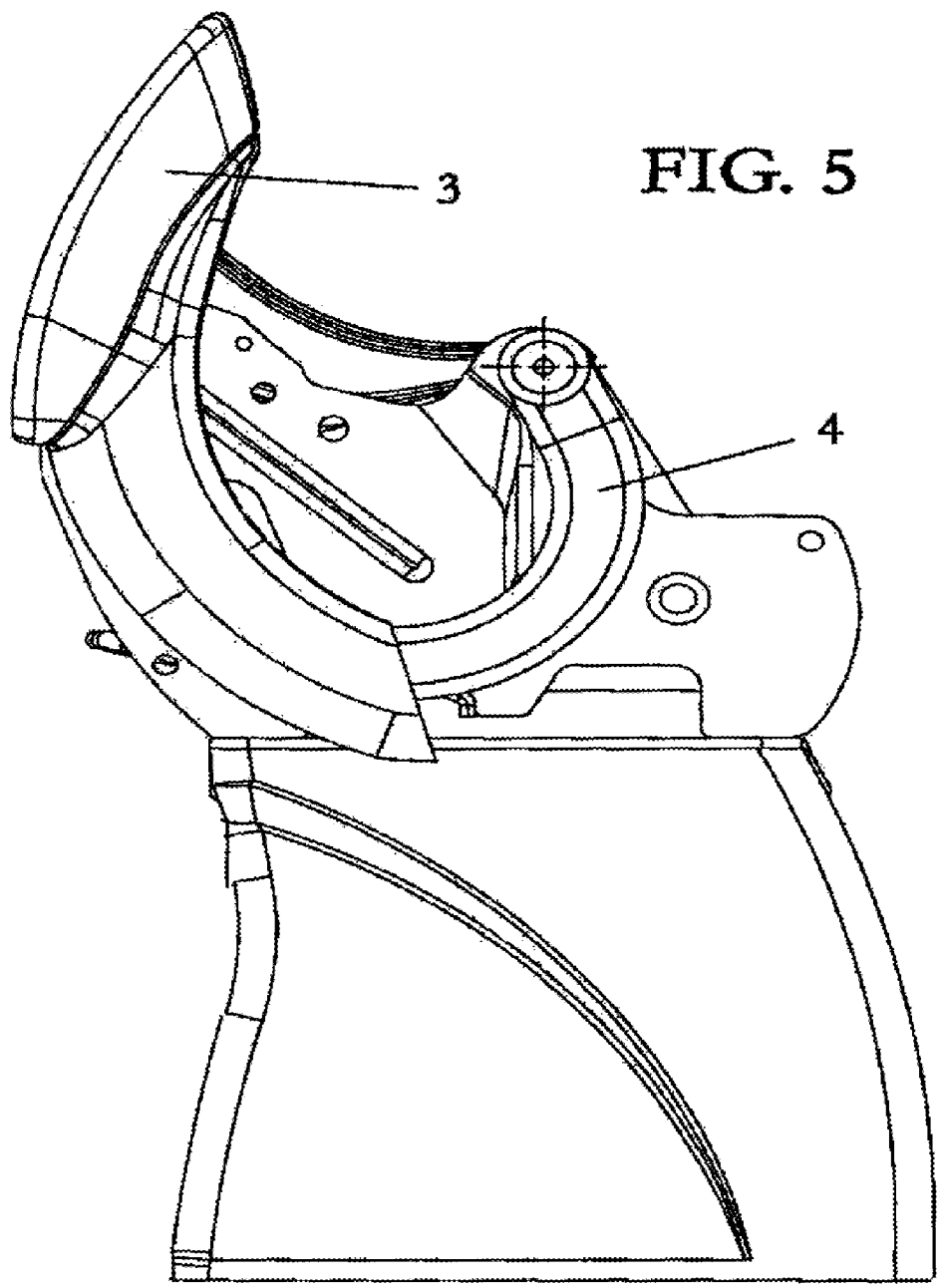

These armrests 3 can be folded between a substantially horizontal position (FIGS. 1 and 4) and a substantially vertical position (FIGS. 2 and 5).

According to the invention, the armrest describes a downward curved trajectory when the armrest 3 goes from the substantially horizontal position to the substantially vertical position, as can be observed better in FIGS. 4 and 5.

The armrest 3 of the armchair of this invention has a curved profile and slides down a guide 4 that is located on the side of the seat 1.

As can be seen in FIG. 2, the armrest 3, when in the vertical position, is mostly beneath the level of the seat 1, and does not protrude frontally from the backrest.

Figure 3:
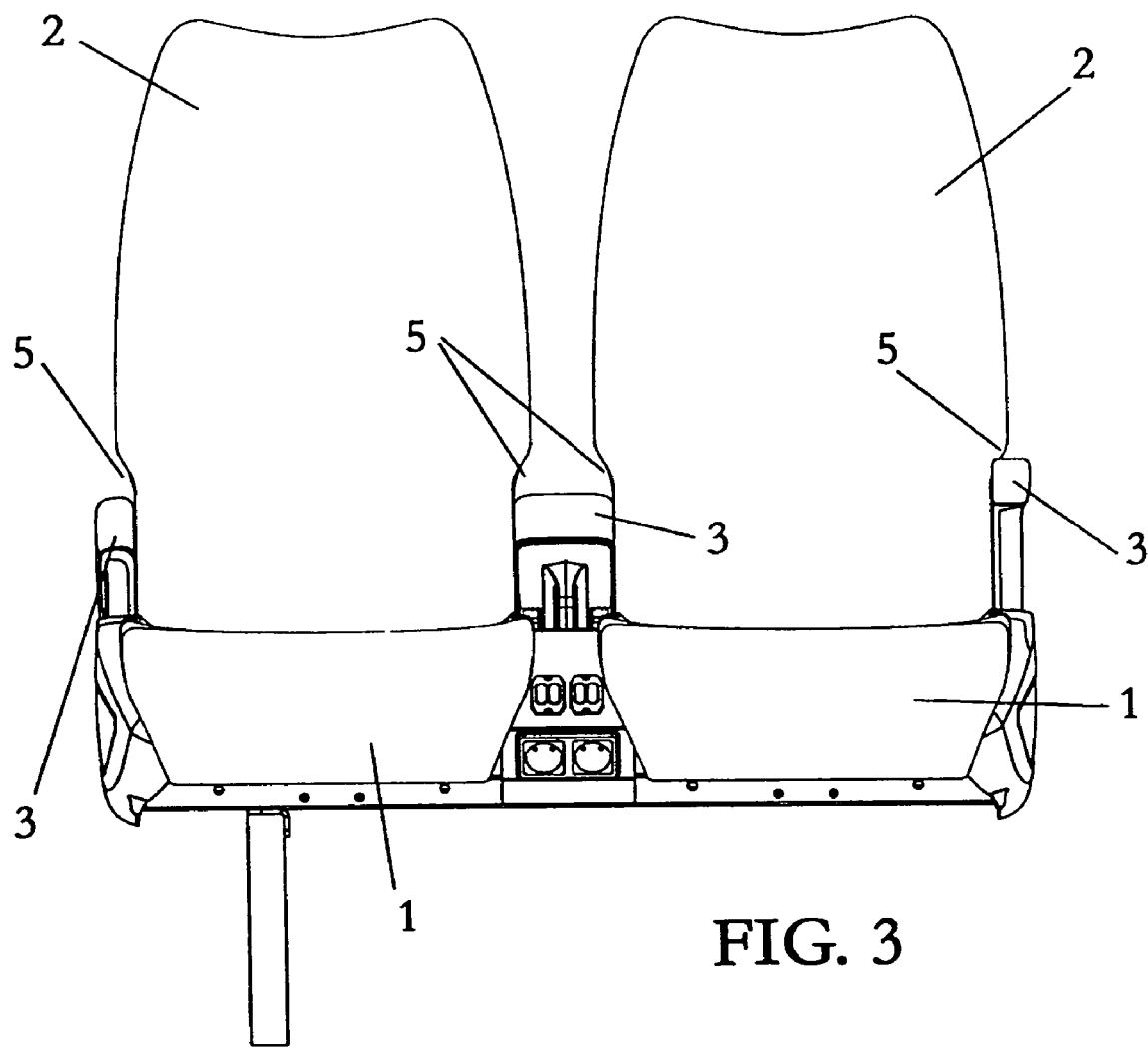
FIG. 3 is a frontal elevation view of two armchairs of the present invention placed side by side.

Furthermore, a can be seen on FIG. 3, the armrest 3 is located in a space 5 that has been created in the sides of the backrest 2.

Thus, when in a vertical position, the armrest 3 does not bother the armchair user, as it is housed in a position in which it does not protrude from the structure of the armchair. Therefore, the manufacturer can completely exploit the maximum width allowed for the seat.

When two armchairs of this invention are placed side by side (FIG. 3), the armrest 3 between both armchairs advantageously has a width that is double that of other armrests, in opposition to the armchairs used at present.

Although this refers to a specific embodiment of the invention, obviously a person skilled in the art will know that the armchair described herein may undergo many variations and modifications and that all the details mentioned may be replaced by others that are technically equivalent, without departing from the scope of protection defined by the claims attached.

I claim:

1. An armchair for public transport vehicles, comprising:

a seat;

at least one armrest, wherein said at least one armrest arcuately extends in a forward direction from said seat and is folded between a substantially horizontal position and a substantially vertical position, and said at least one armrest describes a downward trajectory when moved from the substantially horizontal position to the substantially vertical position; and a backrest, wherein said at least one armrest, in its substantially vertical position, does not protrude frontally beyond said backrest or said seat.

2. The armchair according to claim 1, wherein the trajectory described by said at least one armrest is a curved trajectory.

* * * * *

UNITED STATES PATENT AND TRADEMARK OFFICE
CERTIFICATE OF CORRECTION

PATENT NO. : 7,134,726 B2
APPLICATION NO. : 10/684933
DATED : November 14, 2006
INVENTOR(S) : Juan Singla Casasayas It is certified that error appears in the above-identified patent and that said Letters Patent is hereby corrected as shown below:

On the Title Page,
Item (75) should read as follows:

Item (75) Inventor: Juan Singla Casasayas, Martorelles (ES)

On Sheet 4 of the drawings, Fig. 4 should be replaced with Fig. 4 as shown on attached page.

On Sheet 5 of the drawings, Fig. 5 should be replaced with Fig. 5 as shown on attached page.

Signed and Sealed this

Ninth Day of September, 2008

JON W. DUDAS
*Director of the United States Patent and Trademark Office*